(12) United States Patent
Fantinuoli

(10) Patent No.: US 11,848,011 B1
(45) Date of Patent: Dec. 19, 2023

(54) SYSTEMS AND METHODS FOR LANGUAGE TRANSLATION DURING LIVE ORAL PRESENTATION

(71) Applicant: KUDO, INC., New York, NY (US)

(72) Inventor: Claudio Fantinuoli, Speyer (DE)

(73) Assignee: Kudo, Inc., New York, NY (US)

( * ) Notice: Subject to any disclaimer, the term of this patent is extended or adjusted under 35 U.S.C. 154(b) by 324 days.

(21) Appl. No.: 17/337,297

(22) Filed: Jun. 2, 2021

(51) Int. Cl.
| | |
|---|---|
| G10L 15/18 | (2013.01) |
| G06F 3/16 | (2006.01) |
| G10L 15/22 | (2006.01) |
| G10L 15/30 | (2013.01) |
| G06F 40/58 | (2020.01) |

(52) U.S. Cl.
CPC .......... *G10L 15/1822* (2013.01); *G06F 3/165* (2013.01); *G06F 40/58* (2020.01); *G10L 15/22* (2013.01); *G10L 15/30* (2013.01)

(58) Field of Classification Search
USPC ......................................................... 704/3–7
See application file for complete search history.

(56) References Cited

U.S. PATENT DOCUMENTS

| | | | |
|---|---|---|---|
| 6,272,461 B1 | 8/2001 | Meredith et al. | |
| 10,089,305 B1 * | 10/2018 | Hodge | H04M 3/42 |
| 2010/0283829 A1 * | 11/2010 | De Beer | H04M 3/56 |
| | | | 348/14.09 |
| 2011/0270601 A1 * | 11/2011 | Karapetian | G06F 40/58 |
| | | | 704/277 |
| 2020/0312352 A1 | 10/2020 | Kamiyama et al. | |

FOREIGN PATENT DOCUMENTS

JP 2004023262 A * 1/2004 ............ G06F 17/28

OTHER PUBLICATIONS

Gibbon et al., Katarzyna Klessa, Jolanta Bachan; "Duration and speed of speech events: A selection of methods," Lingua Posnaniensis, 2015; 25 pages.

Quintas et al., Translating and the Computer 39, The International Association for Advancement in Language Technology, Nov. 16-17, 2017; 130 pages.

\* cited by examiner

*Primary Examiner* — Leonard Saint-Cyr
(74) *Attorney, Agent, or Firm* — Foley & Lardner LLP

(57) ABSTRACT

Disclosed herein are embodiments of systems and methods for facilitating interpretation services by continuously generating a real time speed of speech for a set of spoken words within an electronic communication session. A processor continuously generates the real time speed of speech by iteratively generating the real time speed of speech upon parsing each spoken word from audio input signals of the electronic communication session. Iteratively generating the real time speed of speech may be based on a frequency of a subset of the set of spoken words within a preceding time interval of each spoken word. The systems and method may further determine a threshold based on an attribute of the set of spoken words. The method may display on a graphical user interface a graphical indicator having a visual feature that changes when the continuously generated real time speed of speech achieves the threshold.

16 Claims, 5 Drawing Sheets

SYSTEMS AND METHODS FOR LANGUAGE TRANSLATION DURING LIVE ORAL PRESENTATION

TECHNICAL FIELD

This application relates generally to methods and systems for facilitating language translation via interpretation service during a live oral presentation.

BACKGROUND

Simultaneous translation, also herein called simultaneous interpreting, is translation in real time of speech such as oral presentations from one language to another. Interpretation services are essential for international panels and conferences. An example of interpretation services is the United Nations interpretation service. Its core function is to provide interpretation from and into different languages for meetings held at the United Nations. Participants from member states are able to discuss and debate matters of importance with ease, thanks to the presence of simultaneous interpretation. Conferences and other big events can use simultaneous interpreters to open up attendance to delegates of multiple nationalities. Simultaneous interpreting services can enhance delivery of safety information in emergency situations.

Simultaneous translation relies on skilled interpreters using suitable equipment in an environment in which the interpreters can work free from distraction. Simultaneous translation allows speakers to deliver their words naturally without having to stop and start while the interpreter catches up, as interpreters are required to provide translations with a delay of just a few seconds. A problem can arise however when speakers deliver oral presentations at excessive speaking speeds, that even highly skilled interpreters may provide reduced quality simultaneous interpretation of high pace speech. In addition to speaking speed, other attributes of live oral presentations can affect quality of simultaneous interpretation, such as translation difficulty, sound quality, speech density, and language associated with live oral presentations.

SUMMARY

For the aforementioned reasons, there is a need for an efficient system that supports interpretation services providing reliable, high quality translations during live oral presentations. Discussed herein are systems and methods that provide speakers visual indications of speaking pace including excessive speeds of speech during live oral presentations. Embodiments described herein generate graphical indications of speaking pace in real time, while avoiding abrupt or irregular visual effects that can distract speakers. Embodiments described herein may monitor other attributes of live oral presentations such as translation difficulty, sound quality, speech density, and language associated with live oral presentations, and provide speakers visual indications of these attributes.

In one embodiment, a method may include continuously generating, by a processor, a real time speed of speech for a set of spoken words within an electronic communication session. The processor may continuously generate the real time speed of speech by iteratively generating the real time speed of speech upon parsing each spoken word from input speech signals of the electronic communication session. Iteratively generated real time speed of speech may be based on a frequency of a subset of the set of spoken words within a preceding time interval of each spoken word. The method may further include determining, by the processor, a threshold based on an attribute of the set of spoken words. The method may further include presenting, by the processor, for display on a graphical user interface a graphical indicator having a visual feature that changes when the continuously generated real time speed of speech achieves the threshold.

In another embodiment, a system may include a first electronic device being operated by one or more speakers, and a server connected to the first electronic device via one or more networks. The server is configured to receive input speech signals within an electronic communication session from the first electronic device, wherein the input speech signals are associated with a live presentation. The server is further configured to continuously generate a real time speed of speech for a set of spoken words within the electronic communication session. The server may iteratively generate the real time speed of speech upon parsing each spoken word from the input speech signals of the electronic communication session. The real time speed of speech may be based on a frequency of a subset of the set of spoken words within a preceding time interval of each spoken word. The server is further configured to determine a threshold based on an attribute of the set of spoken words. The server is further configured to present for display on a graphical user interface of the first electronic device, a graphical indicator having a visual feature that changes when the continuously generated real time speed of speech achieves the threshold.

In another embodiment, a system may include a non-transitory storage medium storing a plurality of computer program instructions, and a processor of a first electronic device electrically coupled to the non-transitory storage medium. The processor of the first electronic device is configured to execute the plurality of computer program instructions to receive input speech signals within an electronic communication session from a second electronic device, wherein the input speech signals are associated with a live presentation. The processor of the first electronic device is configured to continuously generate a real time speed of speech for a set of spoken words parsed from the input speech signals of the electronic communication session. The processor may iteratively generate the real time speed of speech based on a frequency of a subset of the set of spoken words within a preceding time interval of each spoken word, upon parsing each spoken word. The processor of the first electronic device is further configured to determine a threshold based on an attribute of the set of spoken words. The processor of the first electronic device is further configured to present for display on a graphical user interface of the first electronic device, a graphical indicator having a visual feature that changes when the continuously generated real time speed of speech achieves the threshold.

It is to be understood that both the foregoing general description and the following detailed description are illustrative and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
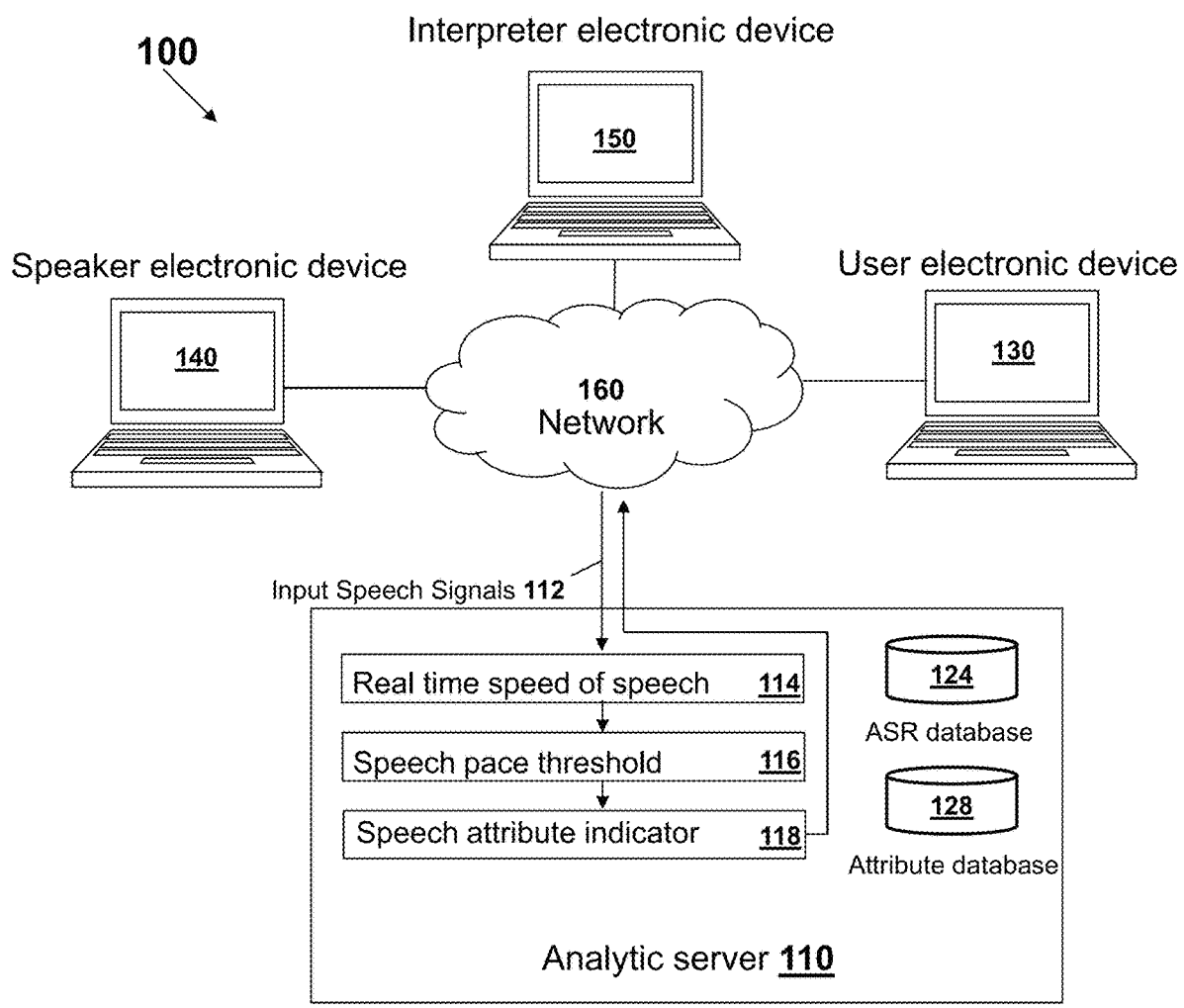
FIG. 1 shows components of an illustrative system for facilitating language translation, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. Other embodiments may be used and/or other changes may be made without departing from the spirit or scope of the present disclosure.

Various embodiments described herein generally relate to methods and systems that provide an efficient technique for facilitating a language interpretation service for a live presentation, based on measuring real time speed of speech for a set of spoken words associated with the live presentation in a real-time communication session. In some embodiments, methods and systems described determine a threshold based on an attribute of the set of spoken words to facilitate translational activity from a source language to one or more other languages. The methods and systems described present for display on a graphical user interface a graphical indicator having a visual feature that changes when the continuously generated real time speed of speech achieves a threshold based on an attribute of the set of spoken words. In some embodiments, a tool within an interpretation system measures the number of words per unit time and provides an indication of pace of speech of a set of spoken words. The tool can provide graphical indications of speed of speech relative to predetermined thresholds of translation speeds for an average interpreter to keep pace. By presenting users in real time with attributes of live oral presentations, the methods and systems described herein can facilitate high quality simultaneous interpretation services.

Simultaneous interpreting is translation of one language to another delivered in real time. A good example of simultaneous interpreting is meetings held at the United Nations in which participants from member states are able to discuss and debate matters of importance with ease, thanks to the presence of simultaneous interpreters. Conferences and other big events can use simultaneous interpreters to open up attendance to delegates of multiple nationalities. Another use case is the delivery of safety information in emergency situations, such as at press conferences, town hall meetings, and live television broadcasts.

Simultaneous interpreting offers various advantages. It allows speakers to deliver their words naturally, without having to keep stopping and starting while the interpreter catches up, as happens with consecutive translation. Simultaneous translation enables the audience to benefit from the speaker's gestures and other non-verbal cues, as they are able to listen with a delay of just a few seconds. Additionally, simultaneous translation can be used to deliver messages where speed is of the essence, permitting these messages to be delivered in multiple languages.

A skilled interpreter must be able to speak two languages fluently, with native ability. Extensive vocabulary is a must. It can be important to have knowledge of specialist terminology such as industry terms, legal jargon, technological references or medical terminology. The interpreter should have active listening skills.

To support effective simultaneous interpreting it is highly desirable to create an environment in which the interpreters can work free from distractions. Interpreters need to be able to hear clearly what the speaker is saying. Unlike consecutive interpretation, in which the speaker pauses every sentence or two to allow the interpreter to translate, simultaneous interpretation keeps pace with the speaker throughout the presentation. A translator's ability to keep pace with the speaker can depend critically on the pace of speech, since excessive speaking speed can prevent even highly skilled interpreters from providing accurate simultaneous translation. Pace of speech is also referred to herein as speed pace, speech rate or speaking speed.

Disclosed embodiments monitor the pace of speech of a live oral presentation and use this information to improve efficiency and accuracy of simultaneous translation of speech. The pace of speaking is preferably measured by calculating the number of words per unit of time spoken by the speaker. In disclosed embodiments, speech pace is calculated as the number of words spoken in a minute (wpm). Standards of speech pace can be used in guiding speakers to slow down or speed up as appropriate for given live oral presentations. Instructions to slow down or speed up the pace of speech may be sent directly to a speaker computing device, to a computing device of an assistant of the speaker, or both. As an example of standards for pace of speech, speech rates for presentations may range from slow speech, e.g., less than 100 wpm; conversational speech: e.g., between 110 wpm and 130 wpm; and fast speech, e.g., more than 140 wpm. In some embodiments, the methods and systems described continuously monitor speech pace of a live oral presentation and can prompt a speaker to slow down in the event pace of speech exceeds a predetermined threshold.

FIG. 1 illustrates components of an illustrative system 100 for facilitating language translation during a live presentation, which may be a real-time communication session. During a live presentation, a computer (e.g., a speaker electronic device) may transmit to another computer through a centralized server or may transmit directly to another computer (e.g., an interpreter electronic device or a user electronic device) without transmitting through a centralized server.

The illustrative system 100 may include an analytic server 110, a user electronic device 130, a panelist electronic device 140, and an interpreter electronic device 150. The user electronic device 130 may be connected with the analytic server 110 via hardware and software components of one or more networks 160. Further, the analytic server 110 may be connected with the speaker electronic device 140 and the interpreter electronic device 150 via the network 160. Examples of the network 160 include, but are not limited to, Local Area Network (LAN), Wireless Local Area Network (WLAN), Metropolitan Area Network (MAN), Wide Area Network (WAN), and the Internet. The network 160 may include both wired and wireless communications according to one or more standards and/or via one or more transport mediums. The communication over the network 160 may be performed in accordance with various communication protocols such as Transmission Control Protocol and Internet Protocol (TCP/IP), User Datagram Protocol (UDP), and IEEE communication protocols. In one example, the network 160 may include wireless communications according to Bluetooth specification sets, or another standard or proprietary wireless communication protocol. The network 160 may also include communications over a cellular network, including, e.g. a GSM (Global System for Mobile Communications), CDMA (Code Division Multiple Access), or EDGE (Enhanced Data for Global Evolution) network.

The analytic server 110, the user electronic device 130, the speaker electronic device 140, and the interpreter electronic device 150 may include one or more processors to control and/or execute operations of the system 100. In some embodiments, a single processor may be employed. In some embodiments, a plurality of processors may be employed for configuring the system 100 as a multi-processor system. The processor may include suitable logic, circuitry, and interfaces that are operable to execute one or more instructions to perform data transfer and other operations. The processor may be realized through a number of processor technologies. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. The processor may also include a Graphics Processing Unit (GPU) that executes the set of instructions to perform one or more processing operations.

The user electronic device 130 may be any computing device allowing a participant/user to interact with an analytic server 110. The user electronic device 130 may be operated by a participant or a user, and these terms may be used interchangeably throughout this disclosure. The user electronic device 130 may communicate with the analytic server 110 through one or more networks 150, using wired and/or wireless communication capabilities. The examples of the computing device may include, but are not limited to, a cellular phone, a mobile phone, a desktop computer, a laptop, a personal digital assistant (PDA), a smartphone, a tablet computer, a smart watch, and the like. In operation, a user of the user electronic device 130 may execute an Internet browser or a local language interpretation application that accesses analytic server 110 in order to issue requests or instructions for language interpretation of a source language into one or more different languages. The user may register on the language interpretation application installed on the user electronic device 130 or if the user already has an account, then the user electronic device 130 may transmit credentials from a user interface to the analytic server 110, from which the analytic server 110 may authenticate the user and/or determine a user role.

The speaker electronic device 140 may be any computing device allowing one or more speakers to interact with an analytic server 110 and/or a user electronic device 130. The speaker electronic device 140 may be any computing device comprising a processor and non-transitory machine-readable storage medium allowing the speaker electronic device 130 to interact with the analytic server 110 and/or the user electronic device 130 through one or more networks 150. The examples of the computing device may include, but are not limited to, a desktop computer, a laptop, a personal digital assistant (PDA), a smartphone, a tablet computer and the like. Although FIG. 1 depicts a single speaker electronic device and a single user electronic device, it is intended that the system 100 can be configured for multiple speaker electronic devices and multiple user electronic devices in a many-to-many system.

The speaker electronic device 140 may be configured to generate input speech signals 112 containing audio data of a speaker's live oral presentation. Speaker electronic device 140 transmits input speech signals 112 to the analytic server 110 over a network 150. Input speech signals 112 may be in a source language of the live oral presentation. The analytic server 110 may select one or more interpreters operating one or more interpreter electronic devices 150 to translate the video and/or audio signals in a first language into one or more target languages requested by a user. In some embodiments, the speaker electronic device 140 may also receive video and/or audio signals of participants'/users' questions in a language the participants'/users' speak. For example, the participants/users may ask questions in their languages by issuing requests in the GUI displayed on their respective user electronic device 130. The analytic server 110 may receive such question requests and request one of interpreters 150 to translate the questions into the language the speaker speaks.

The interpreter electronic device 150 may be any computing device allowing an interpreter to interact with an analytic server 110, a speaker electronic device 130, and/or a user electronic device 130. The interpreter electronic device 150 may be any computing device comprising a processor and non-transitory machine-readable storage medium allowing the interpreter electronic device 150 to interact with the analytic server 110, the speaker electronic device 140, and/or the user electronic device 130 through one or more networks 150. The examples of the computing device may include, but are not limited to, a desktop computer, a laptop, a personal digital assistant (PDA), a smartphone, a tablet computer and the like.

The interpreter electronic device 150 may be operated by an interpreter. In operation, the interpreter electronic device 150 may receive request from an analytic server 110 for translation of (audio data for a live oral presentation from one language into another. The analytic server 110 may receive the request for translation of data from a speaker electronic device 140 and/or a user electronic device 130. In some cases, upon receiving a request from an analytic server 110 for translation of data from one language into another language, an interpreter electronic device 150 may execute an algorithm and/or a software program, which may activate a graphical user interface (GUI) provided by an analytic server 110 for an interpreter operating the interpreter electronic device 150 to select incoming source language of the data file and outgoing target language of the same data file.

The analytic server 110 may be a computing device comprising a processor and other computing hardware and software components configured to continuously parse input speech signals 112 received from speaker electronic device 140 into a set of spoken words, and continuously generate a real time speed of speech for the set of spoken words within an electronic communication session. Additionally, analytic server 110 is configured to determine a threshold 116 based on an attribute of the set of spoken words and present a graphical indicator 118 having a visual feature that changes when the continuously generated real time speed of speech achieves the threshold. The analytic server 110 includes a real time speed of speech module 114, a speech pace threshold module 116, and a speech attribute indicator module 118. Modules 114, 116, 118 are software modules that provide this functionality, though this functionality may be otherwise integrated into the analytics server 110, and more or fewer modules may be utilized. Modules 114, 116, 118 operate in conjunction with an automatic speech recognition (ASR) database 124 and an attribute database 128. Components of analytic server 110 may be logically and physically organized within the same or different devices or structures, and may be distributed across any number of physical structures and locations (e.g., cabinets, rooms, buildings, cities). For example, analytic server 110 may comprise, or may be in networked-communication with ASR database 124 and attribute database 128. The ASR database 124 and attribute database 128 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and other management functions generated by the analytic server 110.

In some embodiments, a memory of the ASR database 124 and attribute database 128 may be a non-volatile storage device for storing data and instructions to be used by a processor of the analytic server 110. The memory may be implemented with a magnetic disk drive, an optical disk drive, a solid state device, or an attachment to a network storage. The memory may include one or more memory devices to facilitate storage and manipulation of program code, set of instructions, tasks, data, PDKs, and the like. Non-limiting examples of memory implementations may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

In some embodiments, the memory of the ASR database 124 and attribute database 128 may be a temporary memory, such that a primary purpose of the memory is not long-term storage. The memory described as a volatile memory, meaning that the memory do not maintain stored contents when the analytic server 110 is turned off. Examples of the volatile memories may include dynamic random access memories (DRAM), static random access memories (SRAM), and other forms of volatile memories known in the art. In some embodiments, the memory may be configured to store larger amounts of information than volatile memory. The memory may further be configured for long-term storage of information. In some examples, the memory may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

In an embodiment, real time speed of speech module 114 applies ASR techniques to continuously parse input speech signals 112 into a set of spoken words in real time during an electronic communication session associated with a live oral presentation. ASR techniques may apply various machine learning models to recognize speech, such as an acoustic model and a language model. The acoustic model can be used to generate hypotheses regarding which words or subword units (e.g., phonemes) correspond to an utterance based on the acoustic features of the utterance. The language model can be used to determine which of the hypotheses generated using the acoustic model is the most likely transcription of the utterance. ASR models may be based on a lexicon stored in ASR database 124. A lexicon generally refers to a compendium of words and associated pronunciations. As used herein, ASR models might refer to any class of algorithms that are used to parse input speech signals into a set of spoken words. In an embodiment, ASR models may refer to methods such as logistic regression, decision trees, neural networks, linear models, and/or Bayesian models.

In an embodiment, ASR models implement a continuous speech recognition system that is capable of recognizing fluent speech. Hidden Markov Models (HMIs) are the most popular models used in the area of continuous speech recognition. HMMs are capable of modeling and matching sequences that have inherent variability in length as well as acoustic characteristics. In various embodiments, HMM represents a temporal pattern in the form of a Finite State Network (FSN). Each state models spectral characteristics of a quasi-stationary segment of speech. At every time instant (frame of speech), the system either continues to stay in a state or makes a transition to another in a probabilistic manner. HMI provides efficient algorithms for estimation of parameters of the model from the training data, and efficient algorithms for recognition. Another advantage of HMM is its ability to integrate language models.

In an embodiment, real time speed of speech module 114 outputs a stream or list of spoken words. The stream of spoken words may include a time stamp associated with each respective spoken word. In an embodiment, an API of the speaker electronic device may provide a time stamp included in the input speech signals 112 as each utterance is pronounced. Real time speed of speech module 114 generates time alignment data that aligns each individual word in the stream of spoken words with a time stamp corresponding to that word's beginning time in the input speech signals. In an embodiment, real time speed of speech module 114 may record a time stamp associated with each word in the stream of spoken words parsed by module 114.

In an embodiment, real time speed of speech module 114 also generates a transcription, e.g., a systematic representation of spoken words in written form. In an embodiment, a speech-to-text engine of real time speed of speech module 114 generates an orthographic transcription, which applies rules for mapping spoken words onto written forms as prescribed by the orthography of a given language. Time alignment of orthographic transcriptions can assist in using speech corpora, for example corpora in unscripted, spontaneously produced speech.

Real time speed of speech module 114 continuously analyzes the set of spoken words obtained from the input speech signals 112 to generate a real time speed of speech of a subset of the set of spoken words, also herein called a window or rolling window of spoken words. The subset of the set of spoken words may comprise a portion of the stream of spoken words within a preceding time interval, wherein the portion of the stream of spoken words and time interval are measured as frequently as every spoken word. In an embodiment, module 114 iteratively generates a real time speed of speech by recalculating real time speed of speech at every word in a stream of spoken words. The real time speed of speech may be based on a frequency of the subset of the set of spoken words within the preceding time interval of each spoken word. In an embodiment, the frequency of the subset of the set of spoken words is a number of spoken words per unit time, e.g., number of words per minute (wpm).

The window of spoken words within the preceding time interval may be a predetermined number N, such as 10 words or 20 words. The number of spoken words within the preceding time interval may be customizable. A number of spoken words may be customized based on characteristics of the live oral presentation. For example, complex technical text may represent dense text and a customized window may be 20 words rather than 10 words. The time duration of the preceding time interval may be determined, e.g., by time duration between a time stamp of each spoken word and a time stamp of a spoken word N words previous within a time-aligned stream of spoken words. Real time speed of speech may be normalized by determining a ratio of a number of words in the stream of spoken words to a time duration of the preceding time interval. By way of example, if N is 10 spoken words and time duration of the preceding time interval is 6 sec, the real time speed of speech would be calculated as 10 spoken words/6 seconds, normalized as 100 wpm.

Speech pace threshold module 116 determines a threshold based on an attribute of the set of spoken words. The attribute of the set of spoken words may be a number of spoken words per unit time, e.g., continuously generated for each spoken word in a stream of spoken words. The attribute of the set of spoken words may be other attributes associated with oral presentations delivered in real time or with simultaneous interpretation of such presentations. For example, the attribute of the set of spoken words may be based on at least one of a translation difficulty, sound quality, speech density, language associated with the set of spoken words, sentiment value, accent of a speaker, or a connection speed associated with the electronic communication session.

The threshold based on the attribute of the set of spoken words may be selected based on a relationship of the attribute to quality of simultaneous translation. In an example, the attribute is pace of speech and the threshold is based on pace of speech levels that correlate with ability for an average interpreter to keep pace. In an embodiment, the threshold includes two or more thresholds. In an example, a pace of speech threshold includes a first threshold between good pace of speech and a marginal pace of speech, and a second threshold between a marginal pace of speech and an unacceptably high pace of speech.

Speech attribute indicator module 118 presents a graphical indicator having a visual feature that changes when the continuously generated real time speed of speech generated by module 114 achieves the threshold determined by module 116. Module 118 may provide graphical indications of real time speech pace relative to predetermined speech pace thresholds. The graphical indicator may incorporate visual features with one or more visual characteristics such as color coding, textures, icons and shapes, among other possibilities.

In an embodiment, speech pace threshold module 116 determines a threshold including a first threshold and a second threshold. The speech attribute indicator module 118 presents a graphical indicator having a visual feature configured to change from a first appearance to a second appearance when the continuously generated real time speed of speech achieves the first threshold. The speech attribute indicator module 118 presents a graphical indicator configured to change from the second appearance to a third appearance when the continuously generated real time speed of speech achieves the second threshold.

In an embodiment, speech pace threshold module 116 determines a threshold including a central threshold value, an upper buffer range above the central threshold value, and a lower buffer range below the central threshold value. This threshold arrangement can provide more comprehensible, unambiguous graphical indications by speech attribute indicator module 118 when the real time speed of speech generated by module 114 achieves the threshold defined by module 116. Speech attribute indicator module 118 presents a graphical indicator having a visual feature that changes from a first appearance to a second appearance when the continuously generated real time speed of speech shifts to a level above the upper buffer range. The visual feature changes from the second appearance to the first appearance when the continuously generated real time speed of speech shifts to a level below the lower buffer range.

Figure 2:
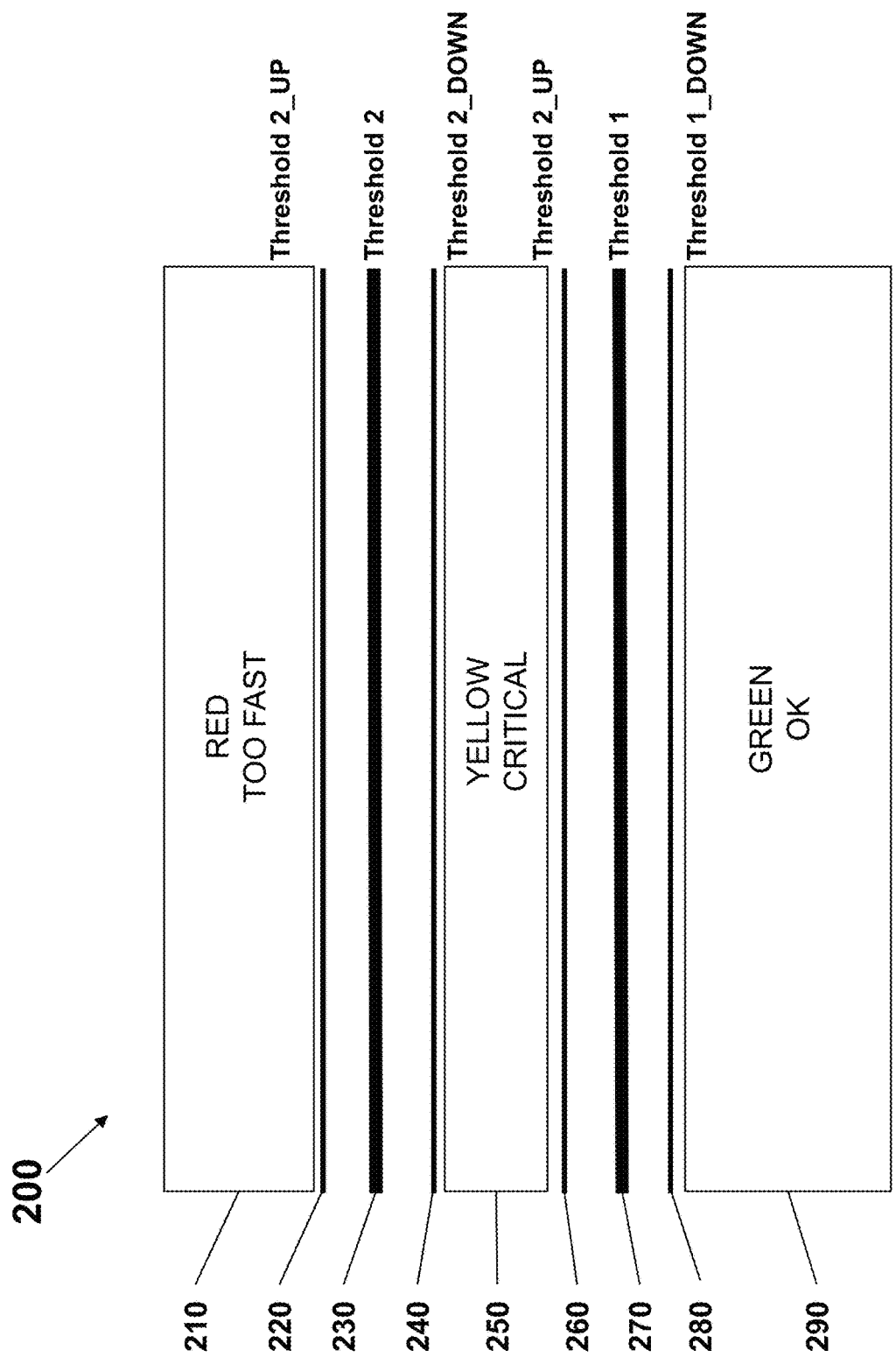
FIG. 2 shows a schematic diagram of an arrangement of thresholds for real time speed of speech, according to an embodiment.

FIG. 2 shows a schematic diagram of a threshold arrangement 200 that includes two thresholds, and three visually distinct zones representing different ranges of speed of speech. The threshold arrangement 200 may be utilized to present a speed classification or a position within a range of classifications to a speaker. In this example, a zone 290 represents OK speeds of speech, a zone 250 represents CRITICAL speeds of speech, and a zone 210 represents TOO FAST speeds of speech. Zone color coding shown includes green 290, yellow 250, and red 210, a scheme roughly analogous to a standard traffic signal. For convenience in portraying the present example, the words corresponding to the colors are printed on the zones in view of the fact that patent drawings are not colored. In reality, the words for the colors would be omitted and the zones would be colored the actual colors on a graphical user interface. Three visually distinct zones representing different ranges of speed of speech can include other labels such as SLOW DOWN for a red zone, ATTENTION for a yellow zone, and PROCEED for a green zone. Similarly, although the colors red, yellow, and green are used in this example, other colors and visual indicators may be utilized.

Thresholds 1 and 2 each include a central threshold value, an upper buffer range above the central threshold value, and a lower buffer range below the central threshold value. Threshold 1 defines a boundary between OK zone 290 and CRITICAL zone 250. Threshold 1 includes a central threshold value 270, an upper buffer range extending from central threshold value 270 to upper limit 260, Threshold 1_UP, and a lower buffer range extending from central threshold value 270 to lower limit 280, Threshold 1_DOWN. Threshold 2 defines a boundary between CRITICAL zone 250 and TOO FAST zone 210. Threshold 2 includes a central threshold value 230, an upper buffer range extending from central threshold value 230 to upper limit 220, Threshold 2_UP, and a lower buffer range extending from central threshold value 270 to lower limit 240, Threshold 2_DOWN.

Threshold 1 and Threshold 2 may have default values, such as 110 wpm for Threshold 1 and 140 wpm for threshold 2. Threshold 1 and threshold 2 may have customizable values. Each buffer range serves as a 'tolerance belt' of x words per minute (up and down). The buffer ranges act as a stabilizing device that limits the tendency of speech attribute indicator 118 to change appearance back and forth, e.g., between green and yellow appearance states or between yellow and red appearance states. A rapid, back-and-forth change of appearance can create a distracting flickering effect. For example, if the threshold were a 110 wpm boundary without buffer ranges, herein called a simple threshold, a flickering effect could occur if the measured speed of speech were to change back and forth in the pattern 109-111-109-111 wpm as each new word is pronounced by the speaker.

In contrast, in the buffer arrangement of FIG. 2, in order to change appearance state during decrease of speech rate, the speech rate must fall below the lower buffer range. Likewise, in order to change appearance state during increase of speech rate, the speech rate must rise above the upper buffer range. This threshold arrangement provides a more well-ordered transition between appearance states. As an example of stabilizing effect of the threshold arrangement of FIG. 2, with a central threshold value of 110 wpm for threshold 1 and upper and lower buffer zone ranges of 3 wpm, speech attribute indicator 118 would change appearance state as follows in response to an increase in calculated speech rate followed by decrease in calculated speech rate:

Speech rate 107 wpm→Appearance State Green
Speech rate 112 wpm→Appearance State Green
Speech rate 113 wpm→Appearance State Yellow
Speech rate 111 wpm→Appearance State Yellow
Speech rate 109 wpm→Appearance State Yellow
Speech rate 107 wpm→Appearance State Green In another embodiment of stabilized threshold arrangement, real time speed of speech module 114 generates a wpm measurement at each new spoken word and speech pace threshold module 116 defines a simple threshold. Speech attribute indicator module 118 displays change of appearance state in the event wpm crosses the simple threshold and thereafter wpm remains in the same zone (green/yellow/red) for more than x spoken words. An example default value of x is 5 spoken words.

Figure 3A:
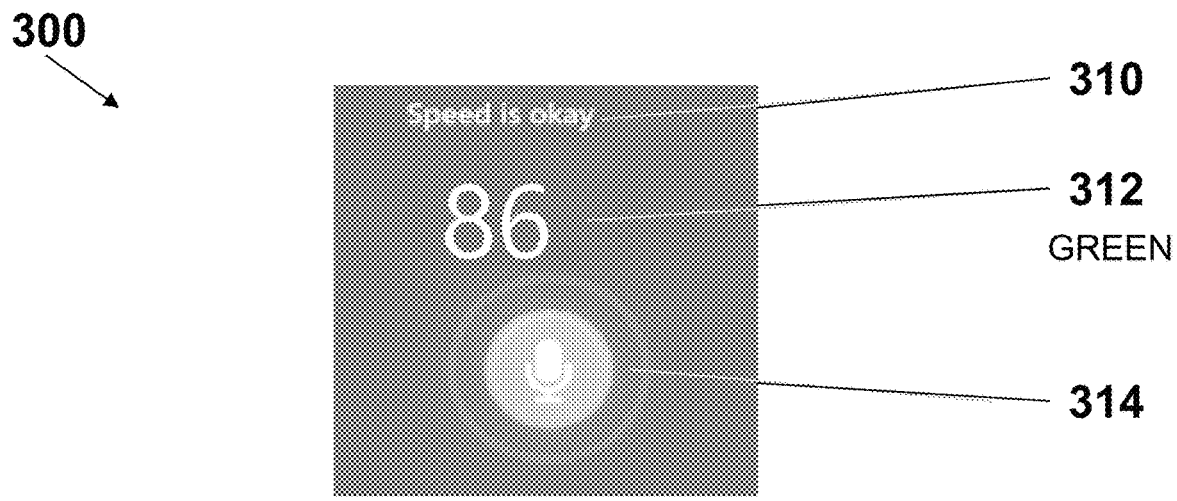
FIG. 3A is a representative view of a graphical user interface showing a first appearance state of a graphical indicator of real time speed of speech, according to an embodiment.
Figure 3B:
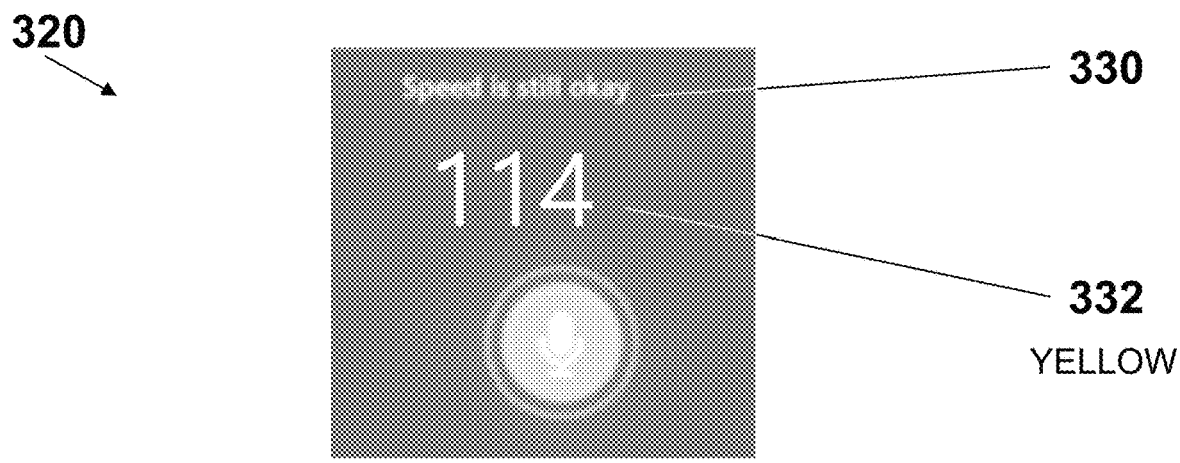
FIG. 3B is a representative view of a graphical user interface showing a second appearance state of a graphical indicator of real time speed of speech, according to an embodiment.
Figure 3C:
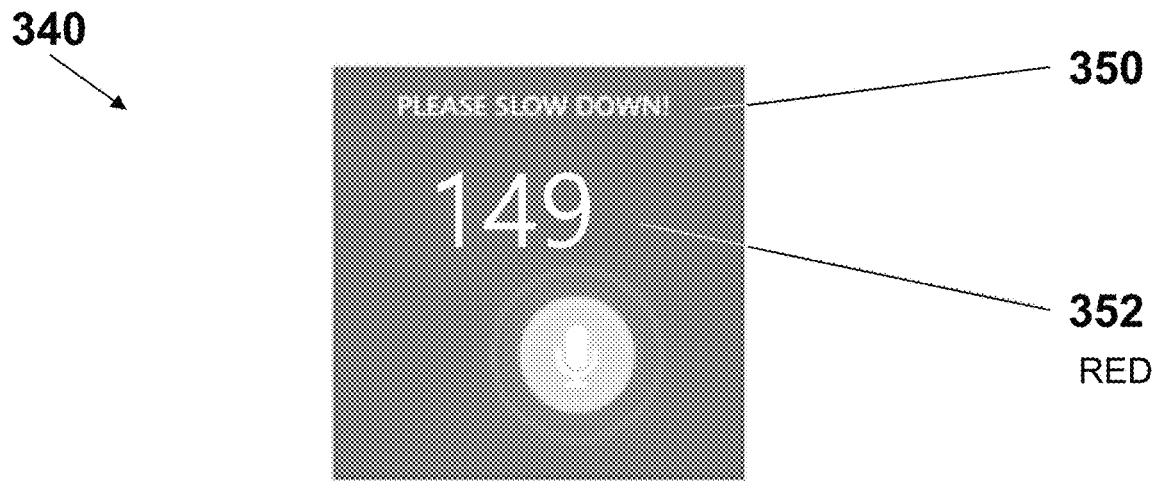
FIG. 3C is a representative view of a graphical user interface showing a third appearance state of a graphical indicator of real time speed of speech, according to an embodiment.

FIGS. 3A-3C are representative views of a GUI showing various appearance states of a graphical indicator of real time speed of speech. The GUI may be presented on the speaker electronic device (shown as device 140 in FIG. 1). The GUI may be displayed on the screen of the device depicting the graphical indicator or may be a device having the graphical indicator. For example, the graphical indicator may be a light (e.g., LED) that changes colors. In another example, the graphical indicator may be a set of lights, each having a different color, where a particular color is illuminated at a time.

FIG. 3A shows a GUI 300 with a first appearance state of the graphical indicator of real time speed of speech. GUI 300 displays label 310 "Speed is okay," and a real time speed of speech 312 of 86 wpm. Real time speed of speech 312 is color coded green. For convenience in portraying the GUIs of FIGS. 3A-3C, words (green, yellow, red) corresponding to the respective colors are printed next to the reference numerals for real time speed of speech in view of the fact that patent drawings are not colored. In reality, the real time speed of speech characters may be colored using the actual color on the GUI. GUI 300 also includes a microphone icon 314, which may be an animated icon with sound waves indicating that a speech attribute indicator module in communication with a microphone of a speaker electronic device is active. In another embodiment, the microphone icon also may include a non-animated design indicating that a speech attribute indicator module in communication with a microphone of a speaker electronic device is not active.

FIG. 3B shows a GUI 320 with a second appearance state of a graphical indicator of real time speed of speech. GUI 320 displays label 330 "Speed is still okay" and a real time speed of speech 332 of 114 wpm. Real time speed of speech 332 is color coded yellow.

FIG. 3C shows a GUI 340 with a second appearance state of a graphical indicator of real time speed of speech. GUI 340 displays label 350 "PLEASE SLOW DOWN!" and a real time speed of speech 352 of 149 wpm. Real time speed of speech 352 is color coded red.

Figure 4:
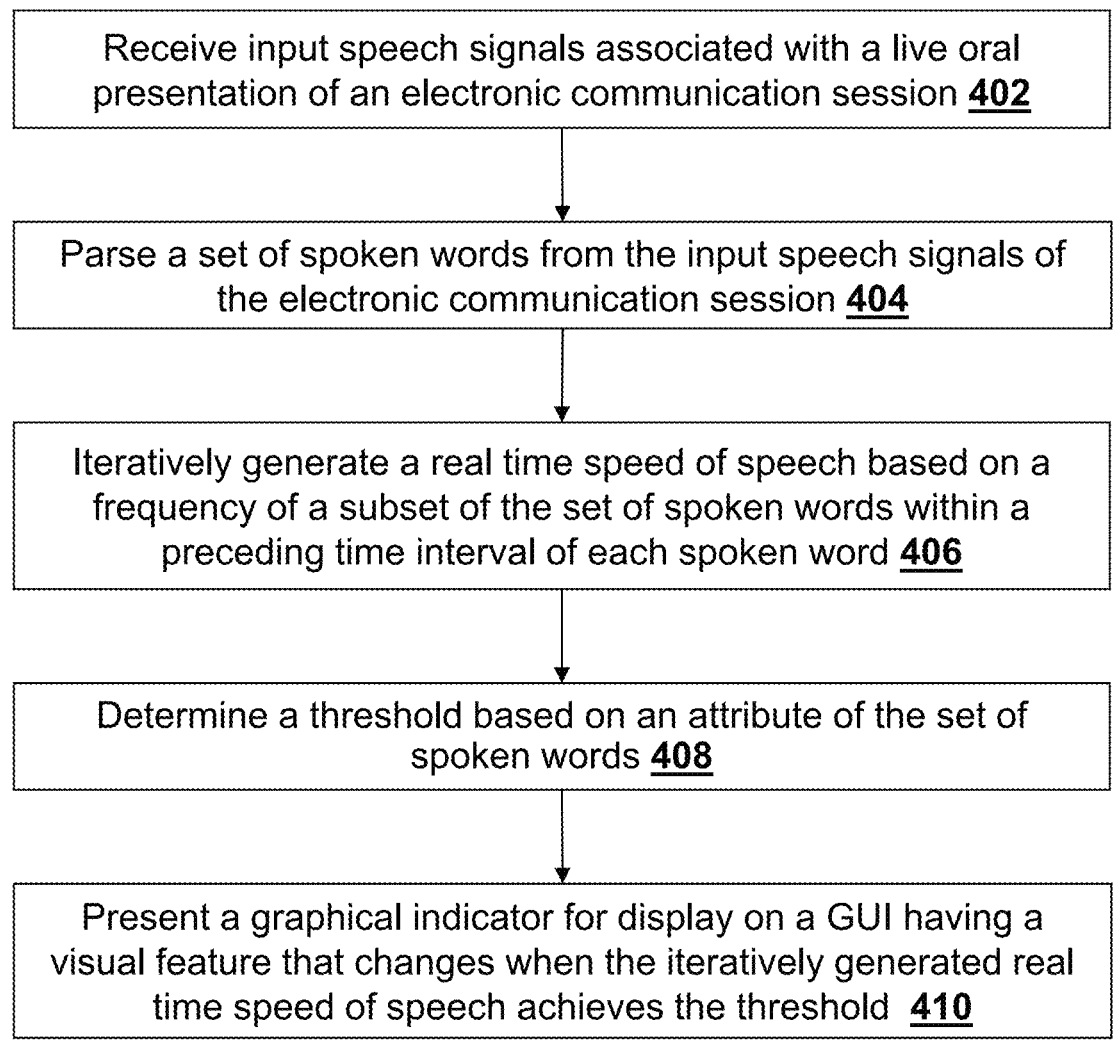
FIG. 4 shows a flow chart schematic diagram of a method for facilitating language translation, according to an embodiment.

FIG. 4 shows execution steps of a processor-based method for facilitating language translation during a live oral presentation, according to an illustrative method 400. In this example, the processor may represent a server, such as the analytics server 110 shown in FIG. 1. The illustrative method 400 shown in FIG. 4 comprises execution steps 402, 404, 406, 408, and 410. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another.

At step 402, a processor receives input speech signals associated with a live oral presentation of an electronic communication session 402. In an embodiment, a processor of an analytic server may receive input speech signals from a speaker electronic device. The input speech signal may be generated via a microphone, handset, or other transducer that converts sound into an electrical signal. A microphone convert the air pressure variations of a sound wave resulting from speaker utterances to an electrical signal. Microphones convert sound waves into AC electrical audio signals and are therefore analog devices. In disclosed embodiments, the input speech signals are digital audio signals. The microphone or other transducer may output digital audio signals via built-in analog-to-digital converters, or may be coupled to an external analog-to-digital converter device that outputs digital audio signals.

In operation, the speaker electronic device may transmit real-time input speech signals in the form of streaming audio to the analytic server. The streaming audio may incorporate various audio codecs such as AAC, MP3, OGG, ALAC, AMR, OPUS, VORBIS, or the like. In an embodiment, an API of the speaker electronic device may provide a time stamp included in the input speech signals as each utterance is pronounced. In another embodiment, the speaker electronic device may record the real time oral presentation and send a recorded data file to the analytic server. The recorded data file may be in the formats such as WAV, MP3, WMA, AU, AA, AMR, RA, AWB, WV, or the like.

At step 404, the processor parses a set of spoken words from the input speech signals received. In an embodiment, step 404 applies ASR techniques to continuously parse input speech signals into a set of spoken words in real time. In an embodiment, step 404 parses a stream or list of spoken words from the input speech signals. The stream of spoken words may include a time stamp associated with each respective spoken word.

At step 406, the processor iteratively generates a real time speed of speech based on a frequency of a subset of the set of spoken words within a preceding time interval of each spoken word. In an embodiment, step 406 iteratively generates a real time speed of speech in a rolling window that includes each word in a stream of spoken words. In an embodiment, the frequency of the subset of the set of spoken words of spoken words per unit time, e.g., number of words per minute (wpm). A number or window of spoken words within the preceding time interval may be a predetermined number N. The window of spoken words within the preceding time interval may be customizable. The time duration of the preceding time interval may be determined, e.g., by time duration between a time stamp of each spoken word and a time stamp of a spoken word N words previous within a time-ordered stream of spoken words. Real time speed of speech may be calculated from a ratio of a number of words in the stream of spoken words to a time duration of the preceding time interval.

At step 408, the processor determines a threshold based on an attribute of the set of spoken words. The attribute of the set of spoken words may be a number of spoken words per unit time, e.g., continuously generated for each spoken word in a stream of spoken words. The attribute of the set of spoken words may be other attributes associated with oral presentations delivered in real time or with simultaneous interpretation of such presentations. For example, the attribute of the set of spoken words, may be based on at least one of a translation difficulty, sound quality, speech density, language associated with the set of spoken words, sentiment value, accent of a speaker, or a connection speed associated with the electronic communication session. The threshold based on the attribute of the set of spoken words may be selected based on a relationship of the attribute to quality of simultaneous translation. In an example, the attribute is pace of speech and the threshold is based on pace of speech levels that correlate with ability for an average interpreter to keep pace.

In determining the threshold, the processor may determine at least a first threshold and a second threshold. The processor may also determine a central threshold value, an upper buffer range above the central threshold value, and a lower buffer range below the central threshold value.

At step 410, the processor presents a graphical indicator for display on a GUI having a visual feature that changes when the iteratively generated real time speed of speech achieves the threshold. In an embodiment, step 410 presents a graphical indicator on a GUI of speaker electronic device 140. The graphical user interface may include at least two visually distinct zones corresponding to the threshold, wherein the graphical indicator associates one of the at least two visually distinct zones with the continuously generated real time speed. The graphical indicator may incorporate visual features with one or more visual characteristics such as color coding, textures, icons and shapes, among other possibilities.

In an embodiment of step 408 that determines a threshold including a first threshold and a second threshold, step 410 presents a graphical indicator having a visual feature that changes from a first appearance to a second appearance when the continuously generated real time speed of speech achieves the first threshold. The visual feature changes from the second appearance to a third appearance when the continuously generated real time speed of speech achieves the second threshold.

In another embodiment, step 408 determines a threshold including a central threshold value, an upper buffer range above the central threshold value, and a lower buffer range below the central threshold value. Step 410 presents a graphical indicator including a visual feature that changes from a first appearance to a second appearance when the continuously generated real time speed of speech shifts to a level above the upper buffer range. The visual feature changes from the second appearance to the first appearance when the continuously generated real time speed of speech shifts to a level below the lower buffer range.

Figure 5:
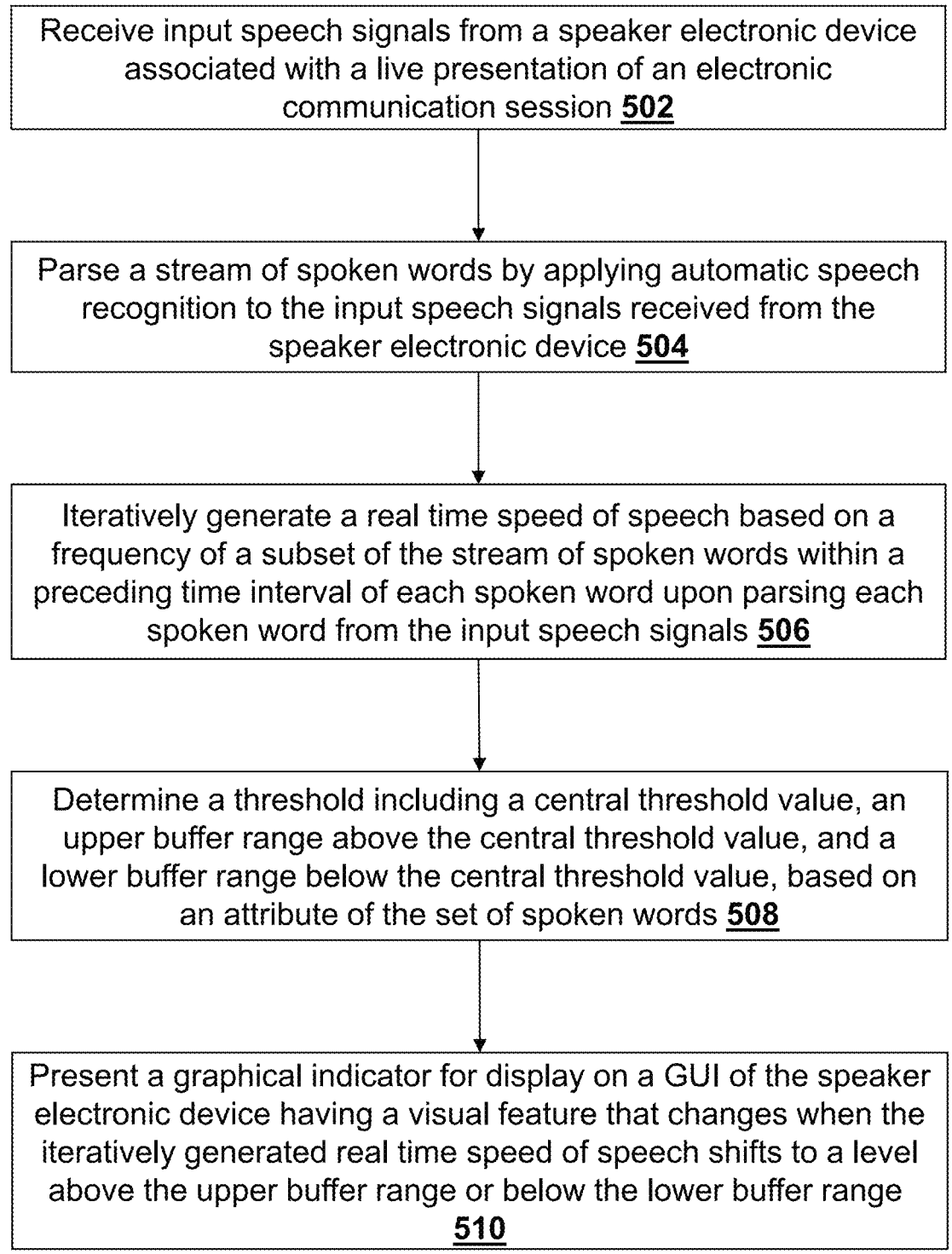
FIG. 5 shows a flow chart schematic diagram of a method for facilitating language translation, according to an embodiment.

FIG. 5 shows execution steps of a processor-based method for facilitating language translation during a live oral presentation, according to an illustrative method 500. In this example, the processor may represent a server, such as the analytics server 110 shown in FIG. 1. The illustrative method 500 shown in FIG. 5 comprises execution steps 502, 504, 506, 508, and 510. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another.

At step 502, the processor receives input speech signals from a speaker electronic device associated with a live presentation of an electronic communication session. At step 504, the processor parses a stream of spoken words by applying automatic speech recognition to the input speech signals received from the speaker electronic device. At step 506, the processor iteratively generates a real time speed of speech based on a frequency of a subset of the stream of spoken words within a preceding time interval of each spoken word upon parsing each spoken word from the input speech signals. At step 508, the processor determines a threshold including a central threshold value, an upper buffer range above the central threshold value, and a lower buffer range below the central threshold value, based on an attribute of the set of spoken words. At step 510, the processor presents a graphical indicator for display on a GUI of the speaker electronic device having a visual feature that changes when the iteratively generated real time speed of speech shifts to a level above the upper buffer range or below the lower buffer range.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
continuously generating, by a processor, a real time speed of speech for a set of spoken words within an electronic communication session by:
iteratively generating, by the processor, the real time speed of speech based on a frequency of a subset of the set of spoken words within a preceding time interval of each spoken word from input speech signals of the electronic communication session, wherein the frequency of the subset of the set of spoken words is a number of spoken words per unit time calculated from a ratio of a number of words in a stream of spoken words to a time duration of the preceding time interval;
determining, by the processor, a threshold based on an attribute of the set of spoken words; and
presenting, by the processor, for display on a graphical user interface, a graphical indicator having a visual feature that changes when the continuously generated real time speed of speech achieves the threshold.

2. The method of claim 1, wherein the continuously generating the real time speed of speech for the set of spoken words comprises parsing a stream of spoken words from streamed audio signals via automatic speech recognition.

3. The method of claim 2, wherein the parsing the stream of spoken words further comprises generating a time stamp for each spoken word in the stream of spoken words.

4. The method of claim 1, wherein the threshold comprises a central threshold value, an upper buffer range above the central threshold value, and a lower buffer range below the central threshold value.

5. The method of claim 4, wherein the visual feature changes from a first appearance to a second appearance when the continuously generated real time speed of speech shifts to a level above the upper buffer range, wherein the visual feature changes from the second appearance to the first appearance when the continuously generated real time speed of speech shifts to a level below the lower buffer range.

6. The method of claim 1, wherein the threshold comprises a first threshold and a second threshold, wherein the visual feature changes from a first appearance to a second appearance when the continuously generated real time speed of speech achieves the first threshold, and the visual feature changes from the second appearance to a third appearance when the continuously generated real time speed of speech achieves the second threshold.

7. The method of claim 1, wherein the attribute is based on at least one of a translation difficulty, sound quality, speech density, language associated with the set of spoken words, sentiment value, accent of a speaker, or a connection speed associated with the electronic communication session.

8. The method of claim 1, wherein the graphical user interface comprises at least two visually distinct zones corresponding to the threshold, wherein the graphical indicator associates one of the at least two visually distinct zones with the continuously generated real time speed.

9. The method of claim 1, further comprising dynamically revising, by the processor, the threshold based on a revised attribute of at least a portion of the set of spoken words.

10. The method of claim 9, wherein the second audio comprises an audio of at least the portion of the set of spoken words having a different tempo than a tempo of the audio of spoken words transmitted to the translating electronic device.

11. The method of claim 1, further comprising:

transmitting, by the processor, audio of at least a portion of the set of spoken words to a translating electronic device;

receiving, by the processor from the translating electronic device, a second audio; and outputting, by the processor, the second audio to at least one participant of the electronic communication session.

12. A system comprising:

a first electronic device being operated by one or more speakers;

a server connected to the first electronic device via one or more networks; wherein the server is configured to:

receive input speech signals within an electronic communication session from the first electronic device, wherein the input speech signals are associated with a live presentation;

continuously generate a real time speed of speech for a set of spoken words within the electronic communication session by iteratively generating, by the processor, the real time speed of speech based on a frequency of a subset of the set of spoken words within a preceding time interval of each spoken word upon parsing each spoken word from the input speech signals of the electronic communication session, wherein the frequency of the subset of the set of spoken words is a number of spoken words per unit time calculated from a ratio of a number of words in a stream of spoken words to a time duration of the preceding time interval;

determine a threshold based on an attribute of the set of spoken words; and present for display on a graphical user interface of the first electronic device, a graphical indicator having a visual feature that changes when the continuously generated real time speed of speech achieves the threshold.

13. The system of claim 12, wherein the threshold comprises a central threshold value, an upper buffer range above the central threshold value, and a lower buffer range below the central threshold value, wherein the visual feature changes from a first appearance to a second appearance when the continuously generated real time speed of speech shifts to a level above the upper buffer range and the visual feature changes from the second appearance to the first appearance when the continuously generated real time speed of speech shifts to a level below the lower buffer range.

14. The system of claim 12, further comprising a second electronic device connected to the server being operated by a user during the electronic communication session, wherein the server is further configured to transmit audio of at least a portion of the set of spoken words to a translating electronic device, receive a second audio from the translating electronic device, and output the second audio to the second electronic device.

15. The system of claim 12, wherein the attribute is based on at least one of a translation difficulty, sound quality, speech density, language associated with the set of spoken words, sentiment value, accent of a speaker, or a connection speed associated with the electronic communication session.

16. A system comprising:

a non-transitory storage medium storing a plurality of computer program instructions; and a processor of a first electronic device electrically coupled to the non-transitory storage medium and configured to execute the plurality of computer program instructions to:

receive input speech signals within an electronic communication session from a second electronic device, wherein the input speech signals are associated with a live presentation;

continuously generate a real time speed of speech for a set of spoken words within the electronic communication session by iteratively generating, by the processor, the real time speed of speech based on a frequency of a subset of the set of spoken words within a preceding time interval of each spoken word upon parsing each spoken word from the input speech signals of the electronic communication session, wherein the frequency of the subset of the set of spoken words is a number of spoken words per unit time calculated from a ratio of a number of words in a stream of spoken words to a time duration of the preceding time interval;

determine a threshold based on an attribute of the set of spoken words; and present for display on a graphical user interface of the first electronic device, a graphical indicator having a visual feature that changes when the continuously generated real time speed of speech achieves the threshold.

\* \* \* \* \*